Patented May 15, 1951

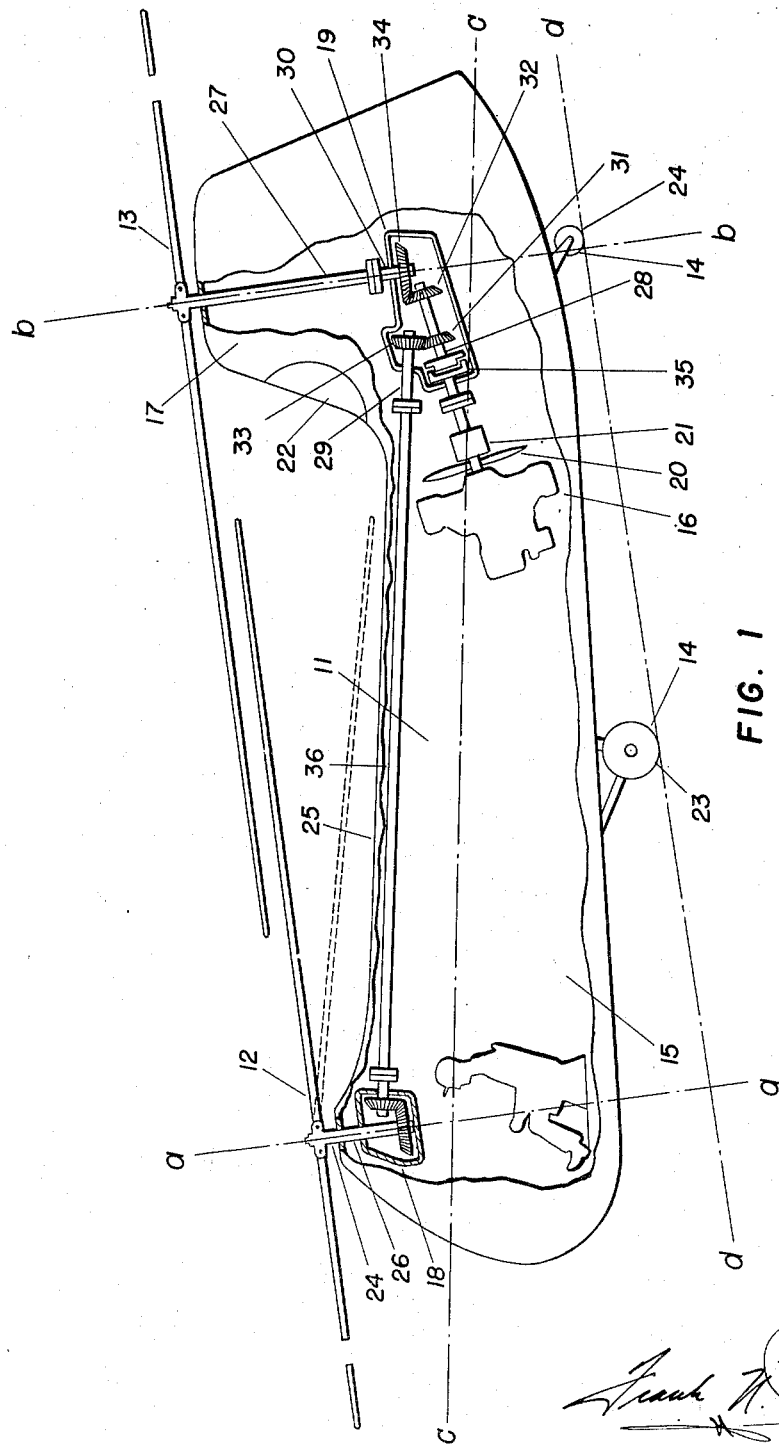

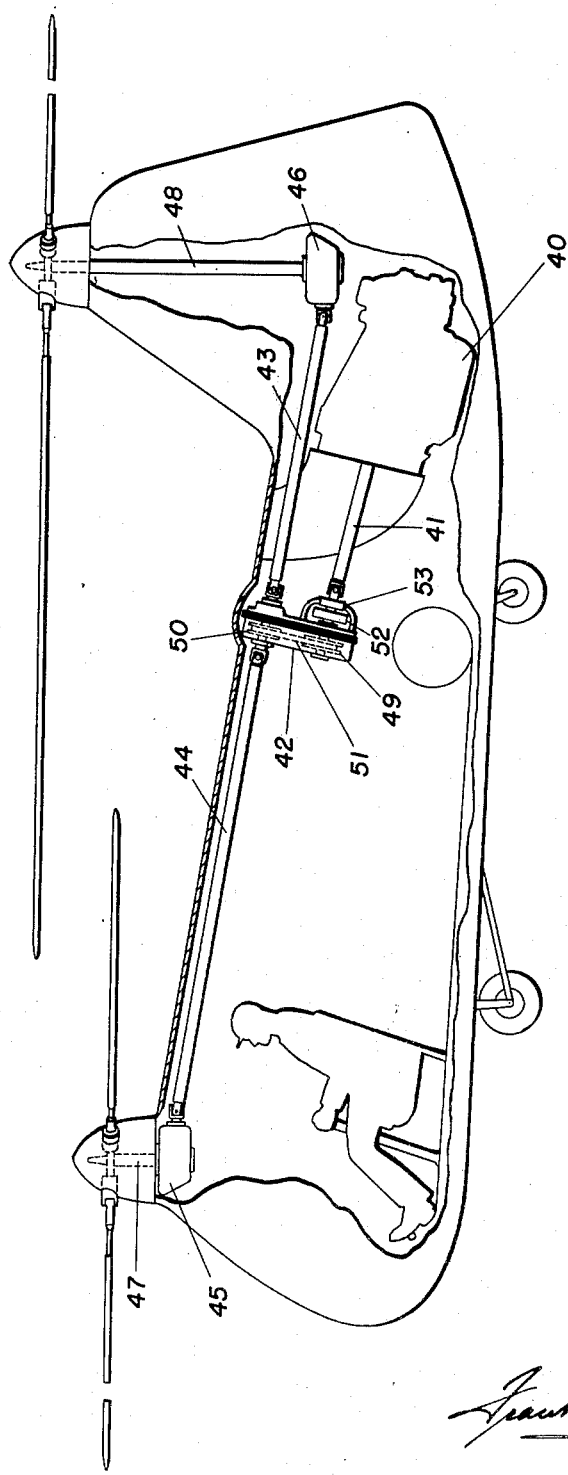

2,552,864

UNITED STATES PATENT OFFICE 2,552,864

TANDEM ROTOR HELICOPTER

Frank N. Piasecki, Lansdowne, Pa., assignor, by mesne assignments, to Piasecki Helicopter Corporation, Morton, Pa., a corporation of Pennsylvania Application February 5, 1948, Serial No. 6,482

3 Claims. (Cl. 244—17.23)

This invention relates to rotary wing aircraft of the type disclosed in my application filed December 16, 1946, Serial No. 716,494, and which matured as Patent No. 2,507,993.

The principal object of this invention is to provide a rotary wing aircraft having high performance characteristics without increasing the size of the machine to such an extent that its use will be limited to large landing areas.

Another object of this invention is to provide a rotary wing aircraft wherein the relationship of the rotor axes to the longitudinal axis of the aircraft and to the ground line as established by the landing gear arrangement is such that the lift vectors of the rotors will be working at their optimum positions for all attitudes of flight.

A still further object of this invention is to provide a rotary wing aircraft having two longitudinally spaced rotors mounted in overlapping relationship and geared together in such phase relationship that the rotors may intermesh when flapping without danger of blade interference.

Another object of this invention is to provide a new and improved drive system arrangement for tandem rotor helicopters.

Other objects and advantages will become apparent when the following description is read in conjunction with the drawings forming a part of this specification.

Figure 1 is an inboard profile view showing the general construction and arrangement of the functional parts of the preferred embodiment of my invention.

Figure 2 is a similar view of a modified form.

Referring more particularly to Figure 1 of the drawings wherein the preferred embodiment of my invention is shown as comprising a fuselage generally indicated by number 11 having rotors 12 and 13 carried at either end of the fuselage. The attitude of the craft as shown in this figure is that assumed when in forward flight. The fuselage 11 is supported on the ground by a landing gear 14. The forward portion of the fuselage 11 forms a pilot and passenger or cargo compartment 15. The aft portion of the fuselage 11 houses a suitable power plant 16, and extending upwardly above the aft portion of the fuselage 11 is a vertical airfoil or stabilizer fin 17 inside of which is housed the rear pylon structure and rear rotor drive shaft. Located directly under the two rotors 12 and 13 are transmissions 18 and 19.

The power plant 16 is cooled by a fan 20 drawing air in through an opening 22 provided in the forward portion of the vertical fin 17.

A landing gear 14 is comprised of two main wheels 23 and a tail wheel 24, is provided for alighting and ground handling purposes.

Forming an important part of this invention is the relationship existing between the rotor axes $a$—$a$ and $b$—$b$ and the axis of minimum drag $c$—$c$ of the craft and the ground reference line $d$—$d$, as established by the landing gear arrangement. The axis of minimum drag or longitudinal axis $c$—$c$ of the aircraft is parallel with the top surface 25 of the fuselage 11 and parallel to the air flow about the craft when it is in forward flight. In order to maintain forward flight it is necessary that the lift vectors of the rotors be tilted forwardly. It should be noted that this requirement of flight is obtained by the angular relationship existing between the rotor shafts 26 and 27 and the minimum drag axis $c$—$c$ of the aircraft or flight line. The arrangement eliminates the use of cyclic pitch normally required by other types of helicopters and permits the front rotor to be mounted in close proximity to the top of the fuselage without danger of the blades flapping downwardly against the top of the fuselage structure.

Maximum performance in vertical flight or take-off is obtained when the rotative axes of the aircraft are vertical and no cyclic pitch is being used. This is obtained in the present invention by arranging the landing gear in such a manner that the axis $a$—$a$ and $b$—$b$ and rotor shafts 26 and 27 are perpendicular to the ground line. When the aircraft is sitting in this position it is tilted slightly upwardly so that there is an angular relationship existing between the longitudinal axis $c$—$c$ and the ground reference line $d$—$d$. When the aircraft is in the most used attitude which is that of forward flight, the fuselage is level adding to the comfort of the occupants and presents the least frontal area to the airstream.

The drive system is comprised of an engine drive shaft with which is incorporated a free wheeling unit 21, a front transmission 18, a rear transmission 19, rotor shafts 26 and 27 and a drive shaft 36 drivingly connecting the front and rear transmissions 18 and 19. The drive shaft 36 runs parallel to the top of the fuselage.

The rear transmission unit 19 is comprised of a power input shaft 28 and two power output shafts 29 and 30. Fixed on the shaft 28 for rotation therewith are two pinions 31 and 32. The pinions 31 and 32 meshing with and normally driving the gears 33 and 34 fixed on the shafts 29 and 30 respectively. The shaft 28 also acts to transmit power from one rotor to the other when the rotors are overrunning the power plant as when in autorotation. Incorporated in the rear transmission unit with the drive shaft is a drive clutch 35.

By providing the transmission arrangement as has been described it is possible to eliminate the mid-gear case usually employed in tandem rotor drive systems, thus effecting a weight saving and making possible a more compact drive system arrangement wherein the power plant may be carried further forward in the fuselage thus achieving a better mass distribution. By using the bevel gears throughout the system, as shown, it is possible to angularly displace the various drive shafts with one another to obtain the desired drive arrangement without employing misaligned universal joints, thus eliminating destructive vibration and loss of power.

In Figure 2 there is shown a modified arrangement of a drive system for helicopters of the type referred to in the present invention. The particular advantage of this type of arrangement is that standard right angle gear reducing units may be used, thus affecting a considerable saving in cost over the special type transmissions required in other helicopters.

This modified arrangement includes a power plant 40 a drive shaft 41 extending therefrom, a mid-reduction unit 42 and a rear drive shaft 43 and front drive shaft 44, front and rear rotor transmissions 45 and 46 from which extends the front and rear rotor shafts 47 and 48 respectively. The mid-reducing unit 42 is comprised of pulleys 49 and 50, and a driving belt 51. The use of this mid-gear case permits a selection of pulleys to vary the drive ratio to allow the use of standard gear reducing units. Manual and overrunning clutches 52 and 53 are incorporated with the drive shaft 41.

I claim:

1. In combination, a tandem rotor helicopter comprised of an elongated fuselage, a power plant in the aft portion of said fuselage, a pair of upwardly extending lift rotor shafts carried by and projecting above said fuselage and spaced longitudinally thereof, means for applying power to said shafts comprising gear reduction units mounted at the lower ends of said rotor shafts, a transmission shaft extending along the underside of the upper surface of said fuselage in parallel relationship thereto and connected to the gear reduction unit of the forward of said shafts, a drive shaft extending upwardly and rearwardly from said power plant and connected to the rear gear reduction unit and connected to said transmission shaft, the aft portion of said fuselage extending upwardly to enclose the rear rotor shaft and to form a vertical stabilizing fin.

2. In tandem rotor helicopters, in combination, an elongated fuselage, a landing gear, a pair of upwardly extending rotor shafts carried by said fuselage and spaced longitudinally thereof, lift rotors mounted on the upper ends of said shafts, the forward shaft being inclined forwardly with respect to the major portion of the upper surface of said fuselage and both of said shafts being inclined forwardly with respect to the longitudinal axis of said fuselage, and being perpendicular to the ground reference line when the helicopter is at rest upon the ground, the rear shaft being of greater length than the forward shaft to place the plane of the aft rotor above that of the forward rotor, the aft portion of the fuselage extending upwardly to house and support the rear rotor shaft and being streamlined to provide a vertical stabilizer, a drive system comprising reduction gears located at the lower ends of the forward and aft rotor shafts, a power plant located in the aft portion of said fuselage, a drive shaft extending rearwardly and upwardly from said power plant and connected to the aft reduction gears, a second drive shaft drivingly connected to the forward reduction gears and extending rearwardly therefrom, said second drive shaft being connected to and normally driven by the first drive shaft, an overrunning clutch interposed between the first drive shaft and the power plant to permit power to be transmitted from the second drive shaft to the first drive shaft when the helicopter is in auto-rotative flight.

3. The combination as set forth in claim 2 and wherein the gear reduction units and second drive shaft are mounted in the fuselage in a plane parallel to and closely underlying the major portion of the upper surface of the fuselage.

FRANK N. PIASECKI.

REFERENCES CITED

The following references are of record in the file of this patent:

UNITED STATES PATENTS

| Number | Name | Date |
|---|---|---|
| 1,225,202 | Ahle et al. | May 8, 1917 |
| 1,849,235 | Kibbe | Mar. 15, 1932 |
| 2,023,105 | Smith | Dec. 3, 1935 |
| 2,233,747 | Riedl | Mar. 4, 1941 |
| 2,273,303 | Waldron | Feb. 17, 1942 |

FOREIGN PATENTS

| Number | Country | Date |
|---|---|---|
| 155,974 | Switzerland | Oct. 1, 1932 |